(12) United States Patent
Kracker

(10) Patent No.: US 7,775,693 B2
(45) Date of Patent: Aug. 17, 2010

(54) VEHICLE INTERIOR LIGHT ASSEMBLY

(75) Inventor: Thomas G. Kracker, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 12/145,111

(22) Filed: Jun. 24, 2008

(65) Prior Publication Data

US 2009/0316421 A1 Dec. 24, 2009

(51) Int. Cl.
*B60Q 3/00* (2006.01)

(52) U.S. Cl. ........................ 362/488; 362/490

(58) Field of Classification Search ............... 362/488, 362/490

See application file for complete search history.

(56) References Cited

U.S. PATENT DOCUMENTS

| | | | |
|---|---|---|---|
| 3,737,651 A | 6/1973 | Shute | |
| 4,499,528 A | 2/1985 | Hawlitzki | |
| 4,764,851 A * | 8/1988 | Hartmann | 362/546 |
| 4,989,956 A | 2/1991 | Wu et al. | |
| 5,136,485 A | 8/1992 | Muller | |
| 5,508,897 A | 4/1996 | Van Order | |
| 5,582,474 A | 12/1996 | Van Order et al. | |
| 5,709,453 A | 1/1998 | Krent et al. | |
| 6,352,359 B1 | 3/2002 | Shie et al. | |
| 6,461,024 B1 | 10/2002 | Becker et al. | |
| 6,502,969 B2 | 1/2003 | Logel et al. | |
| 6,673,873 B1 | 1/2004 | Zimmerman | |
| 6,784,603 B2 | 8/2004 | Pelka et al. | |
| 6,851,841 B2 * | 2/2005 | Sugihara et al. | 362/490 |
| 6,893,147 B2 | 5/2005 | Schottland et al. | |
| 6,945,678 B2 * | 9/2005 | Sugihara et al. | 362/490 |
| 7,220,029 B2 | 5/2007 | Bynum et al. | |
| 7,287,886 B2 * | 10/2007 | Iwai | 362/490 |
| 2005/0105297 A1 | 5/2005 | Suzuki et al. | |
| 2005/0276056 A1 | 12/2005 | Tiesler | |
| 2006/0092649 A1 | 5/2006 | Bynum | |

* cited by examiner

*Primary Examiner*—Stephen F Husar
*Assistant Examiner*—James W Cranson
(74) *Attorney, Agent, or Firm*—Mark E. Duell; Rankin, Hill & Clark LLP

(57) ABSTRACT

An interior light assembly for providing lighting in a vehicle includes a light housing mounted in the vehicle interior. The light housing has an open side. At least one main light source is received in the light housing for providing diffuse lighting in the vehicle interior. An outer diffuser lens closes the open side of the light housing and is disposed over the at least one main light source for diffusing light from the at least one main light source throughout the vehicle interior. The outer diffuser lens has at least one opening defined therein. At least one secondary light source is received in the light housing and is directed toward the at least one opening for providing spot lighting in the vehicle interior. At least one focusing lens is disposed over the at least one opening and the at least one secondary light source for focusing light from the at least one secondary light source to a specific limited location of the vehicle interior. The at least one focusing lens has a textured outer surface to reduce color separation from the at least one secondary light source.

20 Claims, 3 Drawing Sheets

VEHICLE INTERIOR LIGHT ASSEMBLY

BACKGROUND

The present disclosure generally relates to a vehicle interior light assembly, and particularly relates to an interior light assembly having at least one focusing lens disposed over at least one secondary light source (e.g., an LED light source) for focusing light therefrom toward a specific limited location of the vehicle interior, wherein the at least one focusing lens includes a textured outer surface to reduce color separation from the at least one secondary light source.

Courtesy lights are commonly used in vehicles to provide, for example, interior lighting for entrance and egress from the vehicle. These lights are sometimes activated upon opening of a door or by the transmission of a keyless entry code from a key fob, which unlocks the door. The courtesy lights are often disposed on a ceiling of the vehicle for providing diffuse general illumination and in some instances includes spot lighting, which is selectively used for reading maps or other reading material without distracting the driver. In some instances, the driver also needs focused lighting for various tasks. Accordingly, both diffuse lighting for general illumination of the interior of the vehicle and spot lighting for either the driver and/or passenger side are often included in vehicles.

SUMMARY

According to one aspect, an interior light assembly is provided for providing lighting in a vehicle interior. More particularly, in accordance with this aspect, the interior light assembly includes a light housing mounted in the vehicle interior. The light housing has an open side. At least one main light source is received in the light housing for providing diffuse lighting in the vehicle interior. An outer diffuser lens closes the open side of the light housing and is disposed over the at least one main light source for diffusing light from the at least one main light source throughout the vehicle interior. The outer diffuser lens has at least one opening defined therein. At least one secondary light source is received in the light housing and is directed toward the at least one opening for providing spot lighting in the vehicle interior. At least one focusing lens is disposed over the at least one opening and the at least one secondary light source for focusing light from the at least one secondary light source to a specific limited location of the vehicle interior. The at least one focusing lens has a textured outer surface to reduce color separation from the at least one secondary light source.

According to another aspect, an interior light assembly for a vehicle is provided. More particularly, in accordance with this aspect, the interior light assembly includes a main light source disposed in a light housing for providing diffuse lighting. A first secondary light source is disposed in the light housing for providing spot lighting to a first specific limited location of the vehicle. A second secondary light source is disposed in the light housing for providing spot lighting to a second specific limited location of the vehicle. An outer diffuser cover is mounted to the housing over the main light source to diffuse light only from the main light source. A first focus lens is mounted to the housing over the first secondary light source to focus light from the first secondary light source. A second focus lens is mounted to the housing over the second secondary light source to focus light from the second secondary light source. The first and second focus lenses each have a textured outer surface for limiting color separation from the first and second secondary light sources.

According to yet another aspect, an interior light assembly is provided. More particularly, in accordance with this aspect, the interior light assembly includes a light housing having an open side. A main light source is received in the light housing for providing diffuse lighting. An outer diffuser lens closes the open side of the light housing and is disposed over the main light source for diffusing light from the main light source. The outer diffuser lens has at least one opening defined therein. At least one secondary light source is received in the light housing and is directed toward the at least one opening for providing spot lighting. At least one textured focusing lens is disposed over the at least one opening and the at least one secondary light source for focusing light from the at least one secondary light source and reducing color separation.

DETAILED DESCRIPTION

Figure 1:
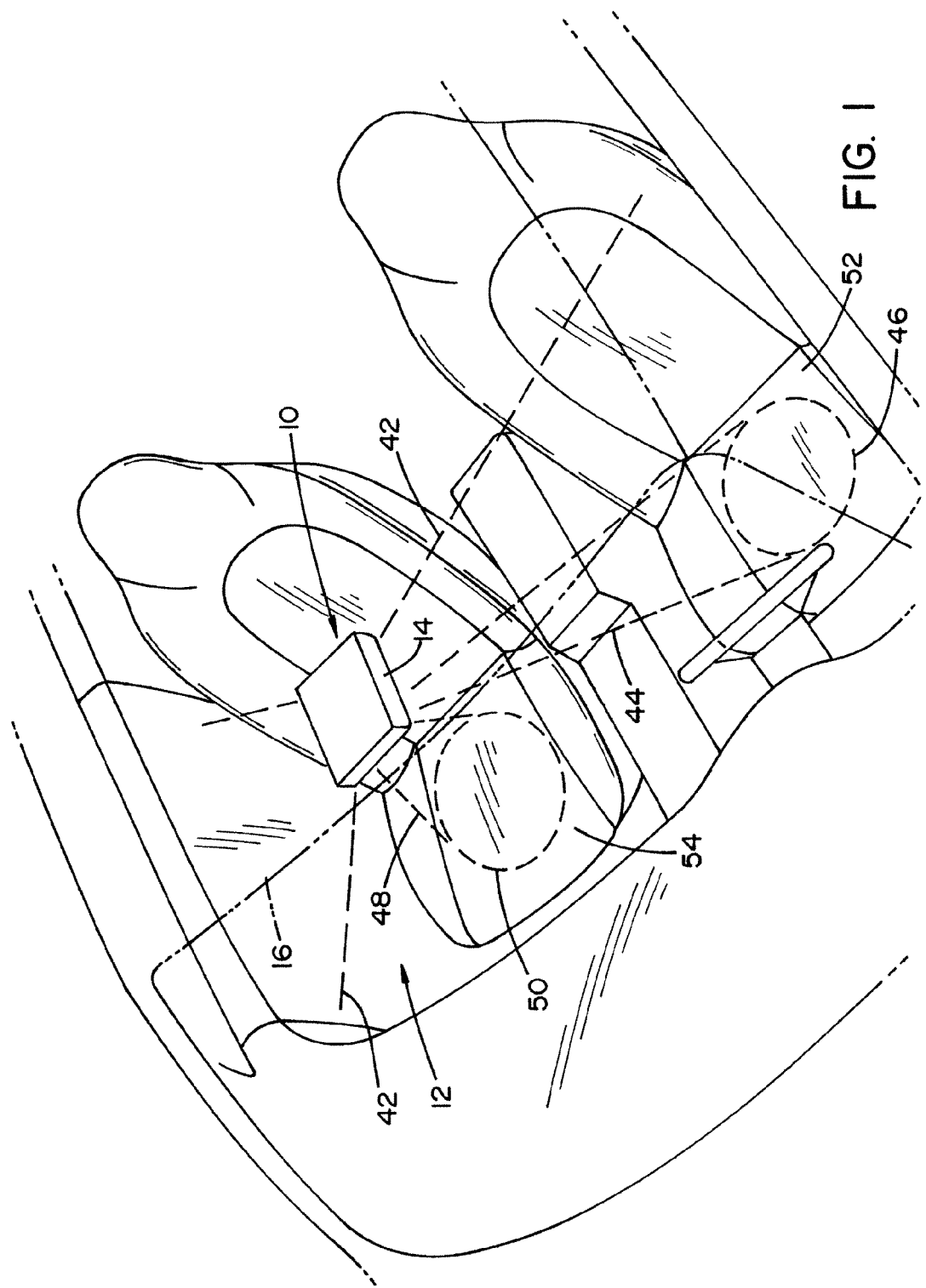
FIG. 1 is a fragmentary perspective view of a vehicle having an interior light assembly for providing lighting in an interior of the vehicle.

Referring now to the drawings, wherein the showings are for purposes of illustrating one or more exemplary embodiments, FIG. 1 shows an interior light assembly 10 of a vehicle for providing lighting in a vehicle interior 12. The interior light assembly 10 includes a light housing 14 mounted in the vehicle interior 12, such as on a vehicle ceiling 16, for example. As will be described in more detail below, the interior light assembly 10 further includes at least one main light source received in the light housing 14 for providing diffuse lighting in the vehicle interior 12 and at least one secondary light source received in the light housing 14 for providing spot lighting in the vehicle interior 12. As will also be described in more detail below, the interior light assembly 10 additionally includes at least one focusing lens disposed over the at least one secondary light source, wherein the at least one focusing lens has a textured outer surface to reduce color separation from the at least one secondary light source.

Figure 2:
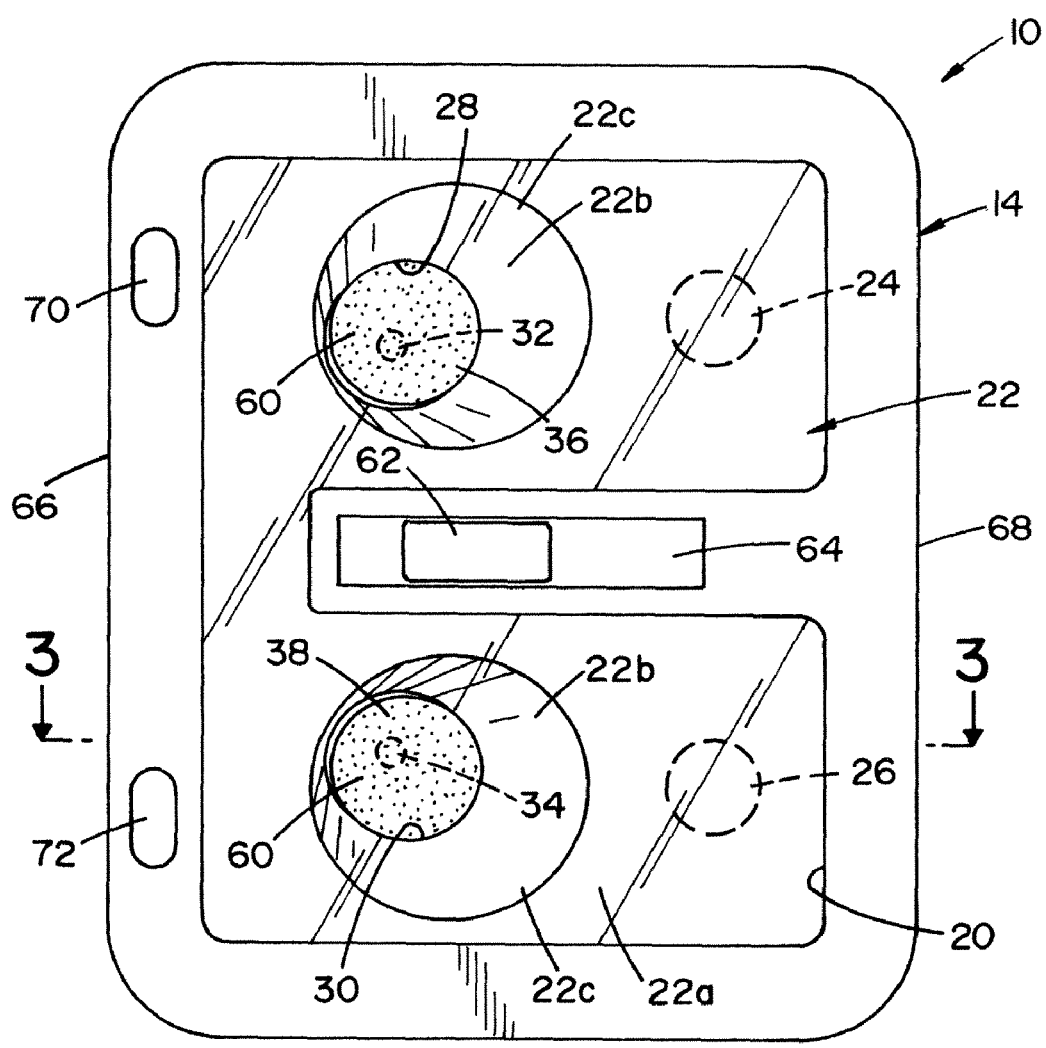
FIG. 2 is a bottom plan view of the interior light assembly of FIG. 1.
Figure 3:
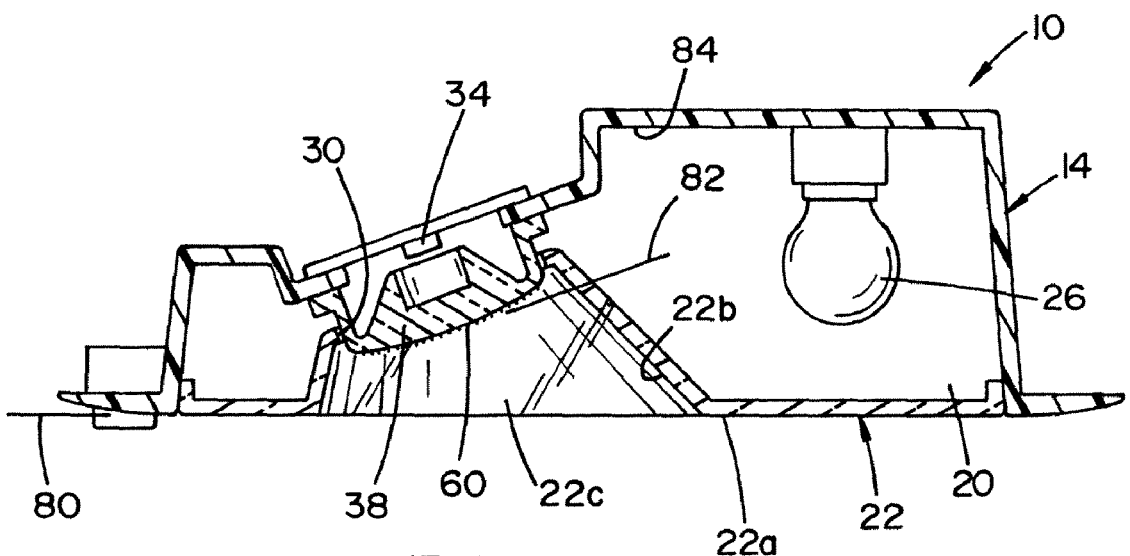
FIG. 3 is a cross sectional view of the interior light assembly taken along the line 3-3 of FIG. 2.

With additional reference to FIGS. 2 and 3, the light housing 14 of the illustrated embodiment has an open side 20. An outer diffuser lens 22 closes the open side of the light housing 14. In the illustrated embodiment, the at least one main light source received in the light housing 14 includes first and second main light sources 24, 26 disposed in the housing 14 for providing diffuse lighting within the vehicle interior 12, though any number of light sources (e.g., one or more than two) can be used to provide diffuse lighting in the light assembly 10. As shown in the illustrated embodiment, the outer diffuser lens 22 can be disposed over the main light sources 24, 26 to thereby diffuse light from the sources 24, 26 throughout the vehicle interior 12. The main light sources 24, 26 can be, for example, LED light sources or any other known type of light source (e.g., an incandescent bulb, as shown in FIG. 3).

The outer diffuser lens 22 can have at least one opening defined therein. In the illustrated embodiment, the outer diffuser lens 22 defines first and second openings 28, 30 therein that are spaced apart from one another. The at least one secondary light source of the illustrated interior light assembly 10 includes a first secondary light source 32 and a second secondary light source 34. Each secondary light source, including the illustrated first and secondary light sources 32, 34, can be directed toward a corresponding opening defined in the outer diffuser lens 22 for providing spot lighting in the vehicle interior 12. More particularly, the first secondary light source 32 is oriented or positioned within the housing 14 to direct spot lighting through the first opening 28. Likewise, the second secondary light source 34 is oriented or positioned within the light housing 14 to direct spot lighting through the second opening 30.

More particularly, in the illustrated embodiment, the openings 28, 30 are recessed and angled relative to a main outer portion 22a of the diffuser lens 22. The lens 22 can include angled frustoconical portions 22b that recess inwards toward respective openings 28, 30 from the main outer portion 22a. In this configuration, the lens cover 22 defines an outer recess 22c that is generally coplanar with the main outer portion 22a for allowing light from the secondary light sources 32, 34 to properly spread radially after passing through the openings 28, 30.

The at least one focusing lens of the illustrated interior light assembly 10 includes a first focus lens 36 disposed over the first opening 28 and a second focus lens 38 disposed over the second opening 30. As will be described in more detail below, the first and second focus lenses 36, 38 are provided for focusing light from respective secondary light sources 32, 34 to respective specific limited locations of the vehicle interior 12 and are particularly configured to prevent or eliminate color separation from the secondary light sources 32, 34.

More specifically, the main light sources 24, 26 are disposed in the light housing 14 for providing diffuse lighting 42 (FIG. 1). The first secondary light source 32 is disposed in the light housing 14 for providing spot lighting 44 to a first specific limited location 46 of the vehicle. Similarly, the second secondary light source 34 is disposed in the light housing 14 for providing spot lighting 48 to a second specific limited location 50 of the vehicle. The first and second specific limited locations 46, 50 can be, for example, designated or predefined areas of vehicle seats 52, 54 in the vehicle such as where a passenger's lap would be positioned when seated in the seats 52, 54. In contrast to the spot lighting 44, 48 provided by the first and secondary light sources 32, 34, the outer diffuser lens or cover 22 is mounted to the housing 14 over the main light sources 24, 26 to diffuse light only from the main light sources 24, 26 and disperse said light throughout the vehicle interior 12.

The focus or focusing lenses 36, 38, which are mounted in corresponding first and second openings 28, 30 defined in the lens 22, are mounted to the housing 14 over the corresponding first and second secondary light sources 32, 34 to focus light therefrom. With particular reference to FIG. 3, each of the first and second focus lenses 36, 38 has a textured outer surface 60 (only lens 38 is shown in FIG. 3) that limits color separation from the first and second secondary light sources 32, 34. As described in more detail below, the inclusion of the textured surface 60 on the focus lenses 36, 38 affects the light from the secondary light sources 32, 34 before the light can diverge and show color separation. The textured surface 60 can be any rough or textured surface, but one acceptable textured surface is formed by sandblasting the outer surfaces of the focusing lenses (e.g., with 36 grit size particles). As best shown in FIG. 3, the second secondary light source 34 is oriented to direct spot lighting 48 through the second opening 30 and the second focus lens 38 received in the second opening 30 toward the second specific limited location 50. Likewise, the first secondary light source 32 is oriented to direct spot lighting 44 through the first opening 28 and the first focus lens 36 received in the first opening 28 to the first specific limited location 46. As will be understood by those skilled in the art, the first and second secondary light sources 32, 34 can be LED light sources and the first and second focus lenses 36, 38 can be LED focusing lenses.

Returning specific reference to FIG. 2, the layout of the interior light assembly 10 can be as illustrated. That is, the main light sources 24, 26 can be spaced apart from one another with an operating switch 62 disposed therebetween. Relative to the vehicle orientation, the main light sources 24, 26 can be disposed toward a rear of the vehicle, whereas the secondary light sources 32, 34 can be disposed toward the front of a vehicle. The openings 28, 30, and thus the secondary light sources 32, 34, can likewise be spaced apart from one another with the operating switch 62 disposed therebetween.

The operating switch 62 can be a conventional switch for use with an overhead light in a vehicle application, particularly a diffuser type light. For example, the operating switch 62 can be a three-position switch, including a first position wherein power to the main light sources 24, 26 is disconnected and thus the light sources 24, 26 remain off, a second position wherein power to the first and second main light sources 24, 26 is selectively connected when specified activities occur (e.g., when a vehicle door is open, for a predetermined period of time after a vehicle car door is opened, when a key is first inserted into an ignition cylinder, etc.), and a third position wherein power is provided to the first and second main light sources 24, 26. In this illustrated embodiment, for example, a first position can be when the operating switch 62 is moved along slot 64 defined in the light assembly 10, and particularly the diffuser lens 22, toward a front side 66 of the interior light assembly 10. The second position can be the illustrated middle position, wherein the operating switch 62 is disposed centrally within the slot 66. The third position can be the position wherein the operating switch is slid along the slot 64 toward a rear side 68 of the interior light assembly 10. Further switches 70, 72 can be provided at the front side 66 of the light assembly 10 for selectively operating the first and second secondary light sources 32, 34. Specifically, operating button 70 can be a two-position button that operates the first secondary light source 32. Likewise, operating button 72 can be a two-position operating button that operates the second secondary light source 34.

As best shown in FIG. 3, the outer diffuser lens 22, particularly main portion 22a, is primarily disposed in a first plane 80. Each of the focusing lenses 36, 38 is primarily disposed in a second plane that is angularly disposed relative to the first plane 80. For example, focusing lens 38 is primarily disposed in a second plane 82 that is angularly disposed relative to the first plane 80 (e.g., angularly disposed by about 30 degrees), though its outer surface 60 has a convex configuration. Similarly, the first and second main light sources 24, 26 are each disposed or mounted at a first angle (e.g., an angle aiming the light sources 24, 26 vertically downward) and the secondary light sources 32, 34 are each disposed or mounted at respective second angles that are angularly disposed relative to the first angle (e.g., pitched negative thirty degrees relative to the plane 80 and the longitudinal direction of the vehicle and/or rolled thirty degrees relative to the plane 80 and a lateral direction of the vehicle).

Having the textured outer surface 60 provided directly on each of the focusing lenses 36, 38 eliminates or substantially reduces color separation in light, such as spot lighting 44, 48, produced by the secondary light sources 32, 34. In prior art designs, color separation could occur from focusing lenses of secondary light sources due to a prismatic effect. For example, with reference to FIG. 4, a secondary light source 90 is shown mounted in a light housing 92. A focusing lens 94 may have been disposed over the secondary light source 90 but does not include a textured outer surface, rather the outer convex surface 96 is generally smooth. This would tend to cause color separation in light produced by the secondary light source 90, particularly for an LED light source. For counteracting color separation of the secondary light source 90, outer diffuser lens 98 could be disposed over a main light source 100 and over the focusing lens 94 (i.e., no openings are in the lens 98 for the secondary light source). While the outer diffuser lens 98 could possibly reduce some color separation in the light produced by the secondary light source 90, particularly where the outer diffuser lens 98 includes pillow-cut optics 102, color separation from the secondary light source 90 could still be observed. Also the outer diffuser lens 98 is spaced from the focusing lens 94 a distance D and this distance, no matter how small, cannot be less than applying a textured surface directly on the focusing lens.

Figure 4:
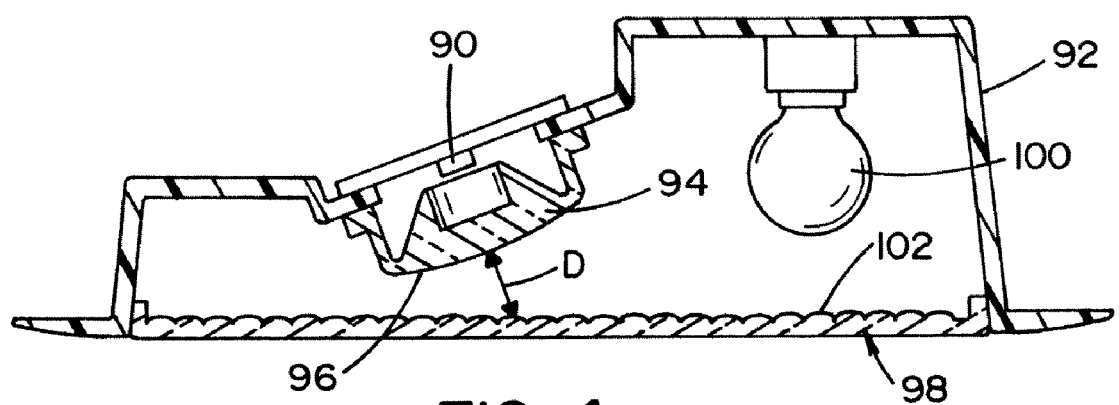
FIG. 4 is a cross sectional view of a prior art interior light assembly.
Figure 5A:
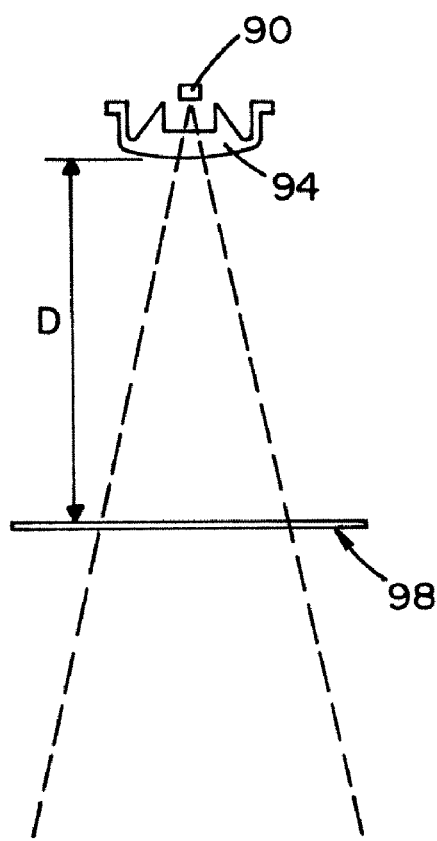
FIGS. 5A and 5B are schematic views showing comparative positioning of a focusing lens relative to a light source.
Figure 5B:
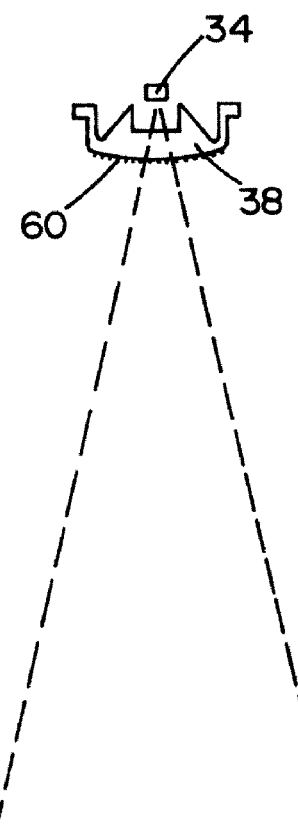

With additional reference to FIGS. 5A and 5B, the arrangement of FIG. 4 is compared against the interior light assembly 10 of FIGS. 1-3. In particular, the arrangement of FIG. 4 is schematically depicted in FIG. 5A by showing the outer diffuser lens 98 positioned relative to the focusing lens 94 (i.e., spaced apart by distance D). In contrast, in FIG. 5B, one focusing lens (e.g., lens 38) with its textured outer surface 60 is schematically shown relative to one secondary light source (e.g., light 34). As illustrated, having the textured outer surface 60 on the focusing lens 38 positions the textured surface as close as possible to the focus lens 38. This is much closer than diffuser lens 98 is positioned relative to focus lens 94. Such positioning as close as possible to the focusing lens advantageously diffuses light from the secondary light source before substantial color separation can occur as it is easier to scatter the color separation directly at the focusing lens rather than later when the light has already had a chance to separate.

It has also been found that the competing interests in outer diffuser lens 22 in having an acceptable appearance and sufficiently diffusing light can be met by forming the outer diffuser lens 22 of an acrylic molding compound sold under the tradename Acrylite® available from Cyro Industries of Parsippany, N.J. Such a composition for the lens 22 allows the lens to be opaque and adequately transmit and diffuse light. In one embodiment, the outer diffuser lens 22 can have a milky white appearance with a haze percentage of 50% or higher. In this configuration, the lens 22 can also have a light transmittance percentage of 85% or higher. If formed of a material sold under the name Acrylite® 8N df, the lens 22 can have a haze percentage of 83% or higher, while maintaining a transmittance percentage of 85% or higher. Alternatively, the lens 22 can be formed of a white pigmented acrylic or some other compound as desired.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An interior light assembly for providing lighting in a vehicle interior, said interior light assembly comprising:
   a light housing mounted in the vehicle interior, said light housing having an open side;
   at least one main light source received in said light housing for providing diffuse lighting in the vehicle interior;
   an outer diffuser lens closing said open side of said light housing and being disposed over said at least one main light source for diffusing light from said at least one main light source throughout the vehicle interior, said outer diffuser lens having at least one opening defined therein;
   at least one secondary light source received in said light housing and directed toward said at least one opening for providing spot lighting in the vehicle interior; and
   at least one focusing lens disposed over said at least one opening and said at least one secondary light source for focusing light from said at least one secondary light source to a specific limited location of the vehicle interior, said at least one focusing lens having a textured outer surface to reduce color separation from said at least one secondary light source.

2. The interior light assembly of claim 1 wherein said at least one focusing lens closes said at least one opening defined in said outer diffuser lens.

3. The interior light assembly of claim 1 wherein said at least one opening includes a first opening and a second opening spaced apart from said first opening, said at least one secondary light source including a first secondary light source directed toward said first opening and a second secondary light source directed toward said second opening, said at least one focusing lens including a first focusing lens disposed over said first opening and said first secondary light source and a second focusing lens disposed over said second opening and said second secondary light source.

4. The interior light assembly of claim 3 wherein said first and said second secondary light sources are each LED light sources.

5. The interior light assembly of claim 1 wherein said at least one secondary light source is an LED light source.

6. The interior light assembly of claim 1 wherein said outer diffuser lens is primarily disposed in a first plane and said outer surface of said at least one focusing lens is primarily disposed in at least a second plane that is angularly disposed relative to said first plane.

7. The interior light assembly of claim 6 wherein said first plane is spaced apart from said outer surface.

8. The interior light assembly of claim 1 wherein said main light source is mounted at a first angle and said at least one secondary light source is mounted at least a second angle that is angularly disposed relative to said first angle.

9. The interior light assembly of claim 1 wherein said outer diffuser lens is opaque.

10. The interior light assembly of claim 9 wherein said outer diffuser lens is milky white.

11. The interior light assembly of claim 9 wherein said outer diffuser lens has a light transmittance percentage of 85% or higher and has a haze percentage of 50% or higher.

12. The interior light assembly of claim 11 wherein said outer diffuser lens has a haze percentage of 83% or higher.

13. The interior light assembly of claim 1 wherein said textured outer surface is formed by sandblasting with 36 grit particles.

14. An interior light assembly for a vehicle, comprising:
   a main light source disposed in a light housing for providing diffuse lighting;
   a first secondary light source disposed in said light housing for providing spot lighting to a first specific limited location of the vehicle;

a second secondary light source disposed in said light housing for providing spot lighting to a second specific limited location of the vehicle;

an outer diffuser cover mounted to said housing over said main light source to diffuse light only from said main light source;

a first focus lens mounted to said housing over said first secondary light source to focus light from said first secondary light source; and a second focus lens mounted to said housing over said second secondary light source to focus light from said second secondary light source, wherein said first and said second focus lenses each have a textured outer surface for limiting color separation from said first and said second secondary light sources.

15. The interior light assembly of claim 14 wherein said outer diffuser cover closes an open side of said light housing and defines first and second openings therein that are spaced apart from one another, said first secondary light source oriented to direct spot lighting through said first opening and said first focus lens received in said first opening toward said first specific limited location, said second secondary light source oriented to direct spot lighting through said second opening and said second focus lens received in said second opening toward said second specific limited location.

16. The interior light assembly of claim 14 wherein said first and said second secondary light sources are LED light sources and said first and said second focusing lenses are LED focusing lenses.

17. The interior light assembly of claim 14 wherein said outer diffuser lens is smooth milky white in appearance.

18. The interior light assembly of claim 17 wherein said outer diffuser lens has a light transmittance percentage of 85% or higher and has a haze percentage of 50% or higher.

19. An interior light assembly, comprising:

a light housing having an open side;

a main light source received in said light housing for providing diffuse lighting;

an outer diffuser lens closing said open side of said light housing and being disposed over said main light source for diffusing light from said main light source, said outer diffuser lens having at least one opening defined therein;

at least one secondary light source received in said light housing and directed toward said at least one opening for providing spot lighting; and at least one textured focusing lens disposed over said at least one opening and said at least one secondary light source for focusing light from said at least one secondary light source and reducing color separation.

20. The interior light assembly of claim 19 wherein said at least one secondary light source is an LED light source and said at least one textured focusing lens is positioned substantially adjacent said at least one light source thereby reducing color separation.

* * * * *